C. J. LANDGREN.
KNIFE.
APPLICATION FILED FEB. 25, 1909.
932,874. Patented Aug. 31, 1909.
Fig. 1.
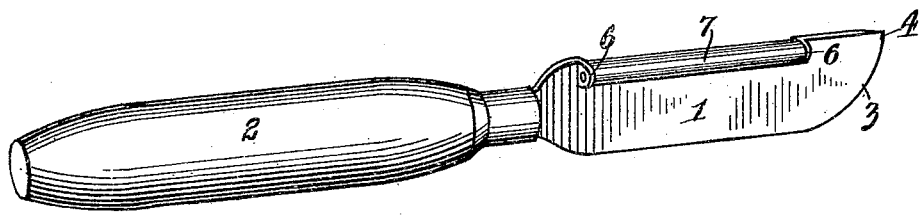
Fig. 2.
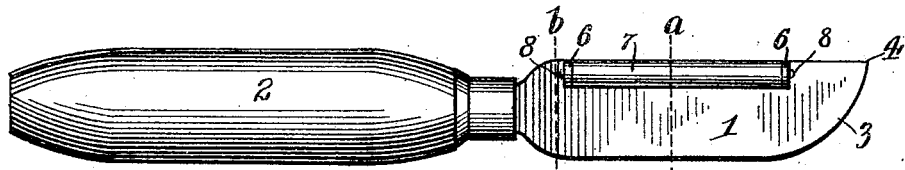
Fig. 3. Fig. 4.
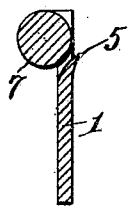 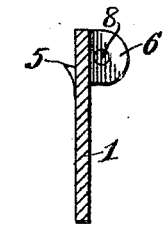
Inventor
Carl J. Landgren
Witnesses
William C. Linton.
J. W. Garner
By Victor J. Evans
Attorney

UNITED STATES PATENT OFFICE.

CARL J. LANDGREN, OF ROCKFORD, ILLINOIS.

KNIFE.

932,874.  Specification of Letters Patent.  Patented Aug. 31, 1909.

Application filed February 25, 1909.  Serial No. 479,870.

*To all whom it may concern:*

Be it known that I, CARL J. LANDGREN, a citizen of the United States, residing at Rockford, in the county of Winnebago and State of Illinois, have invented new and useful Improvements in Knives, of which the following is a specification.

This invention is an improved knife especially adapted for use in paring fruit and vegetables, but also adapted for other purposes and consists essentially of a knife having a roller disposed near its cutting edge to bear on the surface of the fruit or vegetable and prevent the cutting edge from cutting too thick a paring and also serving to guide the knife as hereinafter described and claimed.

In the accompanying drawings: Figure 1 is a perspective view of a knife constructed in accordance with my invention. Fig. 2 is an elevation of the same. Fig. 3 is a sectional view on the plane indicated by the line *a—a* of Fig. 2. Fig. 4 is a similar view on the plane indicated by the line *b—b* of Fig. 2.

The blade 1 may be provided at one end with the usual handle 2. The outer end of the blade is rounded as at 3 from its rear side to its front edge to form at its outer end a point 4 especially adapted for use in removing the eyes and defective pieces of vegetables and fruits. The knife blade is provided with a sharpened cutting edge 5 which extends nearly from end to end of the blade, and at points opposite and in advance of said cutting edge the blade is provided with out-turned lugs 6. That portion of the blade which is between the said lugs is recessed or cut away so that the cutting edge 5 is somewhat to the rear of the extreme front edge of the blade. A roller 7 is disposed somewhat in advance of the cutting edge 5 and is mounted between said lugs 6, the said roller being here shown as provided with journals 8 which revolve in bearing openings in the said lugs. It is the office of this roller to bear on the surface of the fruit or vegetable immediately in advance of the cutting edge so as to prevent the edge from cutting too deeply into the fruit or vegetable and so as to guide the blade easily there over as will be understood.

What is claimed is:—

A knife having a blade provided in its front side with a longitudinal recess, a cutting edge forming the rear side of said recess and disposed to one side of the plane of said blade, said blade being further provided at the ends of the said recess with out-turned lugs, and a roller in said recess in advance of and close to said cutting edge, said roller being journaled in said lugs.

In testimony whereof I affix my signature in presence of two witnesses.

CARL J. LANDGREN.

Witnesses:
 CHARLES A. HILLNER,
 WILLIAM LINDSTROM.